US011630743B2

(12) United States Patent
Desai et al.

(10) Patent No.: US 11,630,743 B2
(45) Date of Patent: Apr. 18, 2023

(54) MANAGING RESTORE WORKLOADS USING WEIBULL MODULUS

(71) Applicant: EMC IP Holding Company LLC, Hopkinton, MA (US)

(72) Inventors: Keyur B. Desai, Cary, NC (US); Dominick J. Santangelo, Raleigh, NC (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 325 days.

(21) Appl. No.: 17/101,326

(22) Filed: Nov. 23, 2020

(65) Prior Publication Data

US 2022/0164261 A1 May 26, 2022

(51) Int. Cl.
G06F 9/46 (2006.01)
G06F 16/23 (2019.01)
G06F 11/14 (2006.01)
G06F 7/08 (2006.01)
G06N 20/00 (2019.01)

(52) U.S. Cl.
CPC ............ G06F 11/1469 (2013.01); G06F 7/08 (2013.01); G06N 20/00 (2019.01); G06F 2201/84 (2013.01)

(58) Field of Classification Search
CPC .... G06F 11/1469; G06F 7/08; G06F 2201/84; G06N 20/00
See application file for complete search history.

(56) References Cited

U.S. PATENT DOCUMENTS

| 8,312,181 | B1* | 11/2012 | Faith ..................... G06F 3/0689 710/22 |
| 10,592,351 | B1* | 3/2020 | Desai ....................... G06F 17/18 |
| 2004/0268051 | A1* | 12/2004 | Berg ........................ G06F 9/342 712/E9.047 |
| 2010/0108502 | A1* | 5/2010 | Inoue .................. C23C 14/3414 204/298.13 |

* cited by examiner

Primary Examiner — Baboucarr Faal
(74) Attorney, Agent, or Firm — Workman Nydegger (57) ABSTRACT

One example method includes determining a modulus such as a Weibull modulus for a recovery operation. Enablement and disablement of a read ahead cache are performed based on the modulus. The modulus is a linearization of a cumulative distribution function, where failures correspond to non-sequential accesses and successes correspond to sequential accesses.

20 Claims, 7 Drawing Sheets

MANAGING RESTORE WORKLOADS USING WEIBULL MODULUS

FIELD OF THE INVENTION

Embodiments of the present invention generally relate to data protection and data protection operations. More particularly, at least some embodiments of the invention relate to systems, hardware, software, computer-readable media, and methods for managing data protection workloads including modulus based restore operations.

BACKGROUND

Data protection systems, which generally perform backup operations and restore operations, are a critical aspect of computing systems today. The loss of data can have a catastrophic impact on an entity. While the need to protect data is widely understood, data protection operations are often burdened by real world limitations. For example, the amount of data being protected can be large. As a result, if there is a need to perform a restore operation, the restore operation may be impacted by the size of the data. As a result, it is beneficial to reduce the amount of time needed to perform the restore operation.

For example, when data is restored, the data being restored is often read in advance and cached. This may work wonderfully when the data that is read in advance turns out to the be data needed by the client. Reading ahead and caching the data, however, can also cause problems. The data that is read in advance and cached may not be the data needed by the restore operation. In addition, reading data from a source such as the cloud can be costly when the cost is based on bytes of data restored or read and the wrong data is read in advance. In other words, reading ahead may cause unnecessary data to be read, which can be costly.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection operations and processes. More particularly, at least some embodiments of the invention relate to systems, hardware, software, computer-readable media, and methods for performing data protection operations such as restore operations.

Example embodiments of the invention further relate to restore operations that optimize performance related, for example, to reading ahead and caching data being restored. Embodiments of the invention may use restore access patterns to determine whether to enable/disable read ahead caching. The decision may be based on a modulus (e.g., a Weibull modulus) derived from the present restore access pattern and/or historical restore access patterns.

Restore operations restore data from a backup of some type. In order to restore the backup, it is necessary to read data from the backup and write the data to a destination. When the restore operation (also referred to herein as a restore workload) reads the backup, the data may be read, by way of example only, sequentially or non-sequentially (randomly). Reading ahead and caching that data when the backup is accessed randomly can result in reading data that is not needed and/or in excessive costs. Reading ahead and caching the read ahead data when the backup is accessed sequentially can improve the performance of the restore operation. However, the manner (sequential or non-sequential) in which the backup is accessed is often unknown. Further the access can switch from sequential to non-sequential or from non-sequential to sequential one or more times for the same restore workload. The speed of the restore operation and the cost can be more effectively managed by controlling when the restore operation uses a read ahead cache.

Embodiments of the invention model restore workloads based on, by way of example only and not limitation, a Weibull statistical probability distribution model. Embodiments of the invention enable/disable a read ahead cache based on the model or based on a shape parameter or modulus (e.g., a Weibull shape parameter or modulus).

In an engineered system, a failure rate is a frequency at which the engineered system fails. The failure rate may be expressed as per unit of time. Standard parameterization of the Weibull distribution defines a shape parameter that relates directly to the failure rate of the engineered system. For example, a Weibull analysis is a method used to perform analysis on life data (e.g., product life data).

Many products have a warranty period and, in many cases, the consumer is encouraged to purchase an extended warranty or protection plan. The terms of these warranties are often based on calculated risks of failure. A life data analysis, such as a Weibull analysis, which can help estimate the risk of product or component failure, and allows the warranty costs and time periods to be better estimated.

Embodiments of the invention adapt this type of distribution to a restore operation and more specifically to caching in a restore operation. In embodiments of the invention, a sequential access pattern is deemed a success and a random access pattern is deemed a failure. More specifically, if the number of times a restore access pattern is sequential is deemed a success and the number of times the restore access pattern becomes non-sequential is deemed as failure, the failure rate can be modelled and can be used to determine when to enable/disable the read ahead cache.

In addition, the modulus (e.g., the Weibull modulus) can be used to adjust non-sequential or sequential thresholds at any point of the restore operation. For example, a static model may state that when a certain percentage of previous accesses are sequential, the access pattern is sequential. Embodiments of the invention allow this threshold to be dynamically adjusted. Using a modulus may allow the threshold to be changed (e.g., increased) because the modulus indicates that the access pattern is trending to or is sequential earlier than a simple static threshold. For example, assume that the sequential threshold is 50% and the window of historical IOs (input/outputs or accesses or reads) is 16. In this case, 8 of the 16 IOs need to be sequential in order to mark the $17^{th}$ access to be sequential. If the modulus trends towards a sequential access pattern (modulus=or is close to 1), the sequential threshold can be increased (e.g., to 56.25%). This means that because the pattern is expected to be sequential, we expect 9 of the previous IOs to be sequential. Thus, on the $18^{th}$ read, with the sequential threshold of 56.25%, 9 of the previous 16 reads should be sequential in order to mark the $18^{th}$ read as sequential.

If the modulus goes below 1 or is trending downwards (toward a non-sequential or random pattern), the sequential threshold may be decreased to a lower value (e.g., 50%). As the modulus continues to go below 1, there will eventually be 9 reads that are non-sequential. When the 50% marks is crossed, the next pattern is marked as non-sequential.

When the modulus trends towards 1 or towards a more sequential pattern, the access pattern is expected to be more sequential and have fewer non-sequential or random accesses. Increasing the threshold allows the restore operation to be less tolerant to a non-sequential access pattern. As a result, the read ahead cache stays enabled for a longer period of time and performance is improved. In one example, as the modulus determination trends toward sequential access, the modulus determination can be used to dynamically adjust the threshold to accommodate more sequential access patterns including future pattern determinations.

The modulus can also assist in machine learning/predictive analysis for restore workloads and facilitates self-adjustment of various restore operation related parameters. In another example, the threshold can be eliminated and the read ahead cache can be enabled/disabled based on the modulus alone.

A distribution such as a Weibull distribution can model a variety of behaviors. Further, other statistical techniques including the variance, mean, and standard deviation can be incorporated into the analysis.

For a continuous function, the probability density function (PDF) is the probability that a random variable has a particular value. The Weibull PDF is used to determine the distribution of failures. An example of a 2 parameter Weibull PDF for any given random variable t, is:

$$f(t) = \frac{\beta}{\eta}\left(\frac{t}{\eta}\right)^{\beta-1} e^{-\left(\frac{t}{\eta}\right)^{\beta}}$$

In this example, $\eta$=a scale parameter and $\beta$=a shape parameter or slope or a Weibull modulus.

Figure 1:
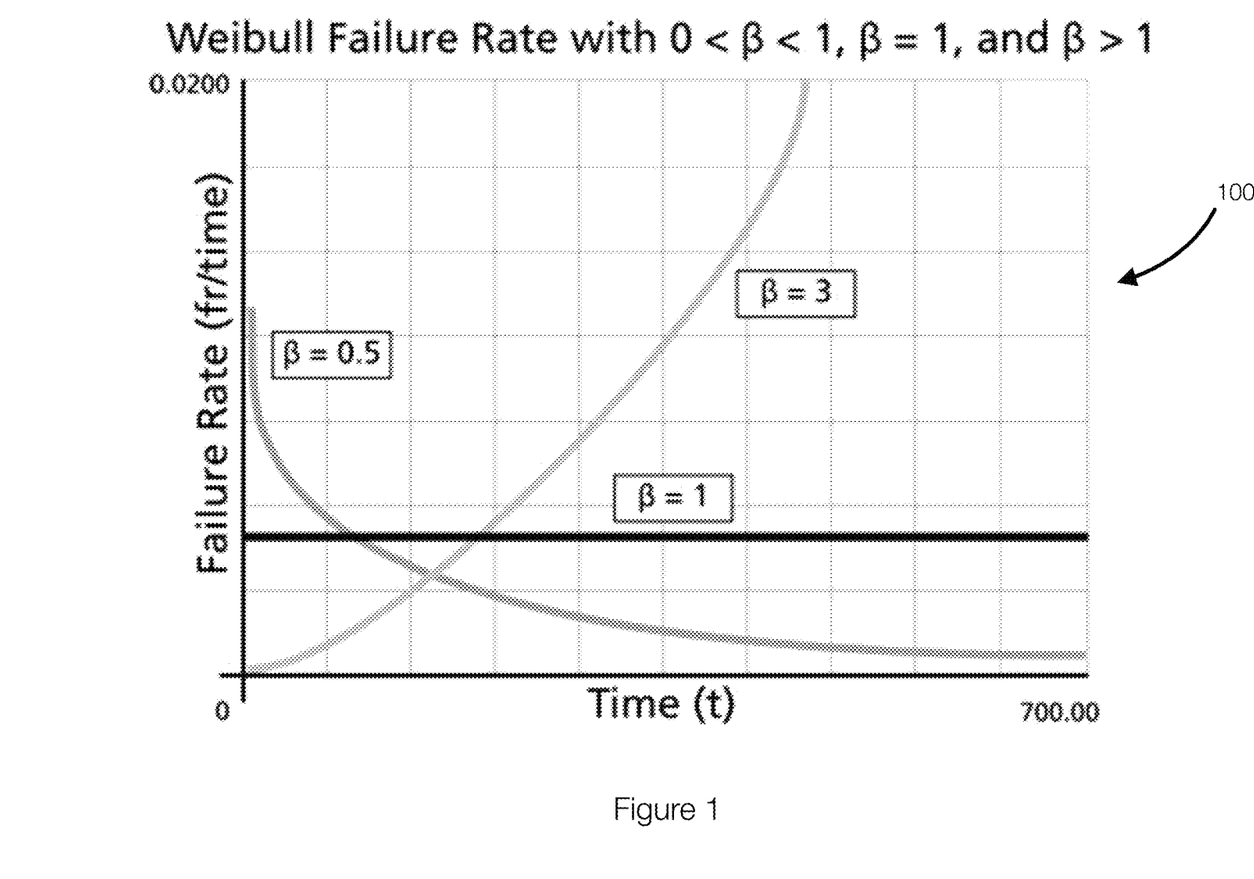
FIG. 1 discloses aspects of a modulus such as a Weibull modulus.

FIG. 1 illustrates a graph that shows an example of a failure rate associated with the modulus $\beta$. More specifically, the graph 100 illustrates that Weibull distributions where $\beta<1$ have a failure rate that decreases with time. Thus, the failures or the bulk of the failures occur early and are known as infantile or early life failures. When performing restore workloads such as restoring a virtual machine, the restore pattern is often random or non-sequential during the initial stage of the restore workload. The restore pattern of a virtual machine often stabilizes to sequential over the course of the restore operation. Applying a Weibull distribution to a restore operation would initially disable the read ahead cache until or while $\beta<1$ and enable or gradually enable the read ahead cache when the restore pattern stabilizes to sequential (e.g., $\beta=1$ or approximately 1).

Weibull distributions with $\beta$ close to or equal to 1 have a fairly constant failure rate. Embodiments of the invention adapt the failure rate to non-sequential reads such that distributions with $\beta$ close to or equal to 1 to indicate a constant sequential read pattern, with occasional random reads. The failure rates (e.g., random or non-sequential reads) are usually sufficiently constant such that read ahead caching is not affected. Restore access patterns with $\beta$ close to or equal to 1 is a situation where read ahead caching may be enabled.

When $\beta>1$, the failure rate increases with time (e.g., wear out failures). In the context of a restore operation, $\beta>1$ indicates a non-sequential read pattern. With a non-sequential read pattern, read ahead caching is not effective and the recommendation would be to disable the read ahead cache.

As applied to a restore process or workload, $\beta<1$ indicates that the access pattern is initially non-sequential and that the access pattern changes to sequential over time. In this case, the read ahead cache can be gradually enabled over time or enabled for the restore process.

$\beta=1$ suggests a stable sequential access pattern. The read ahead cache may be enabled for the restore process.

$\beta>1$ suggests that the access pattern is more non-sequential over time. Read ahead caching may be disabled in this situation for the restore process.

Figure 2:
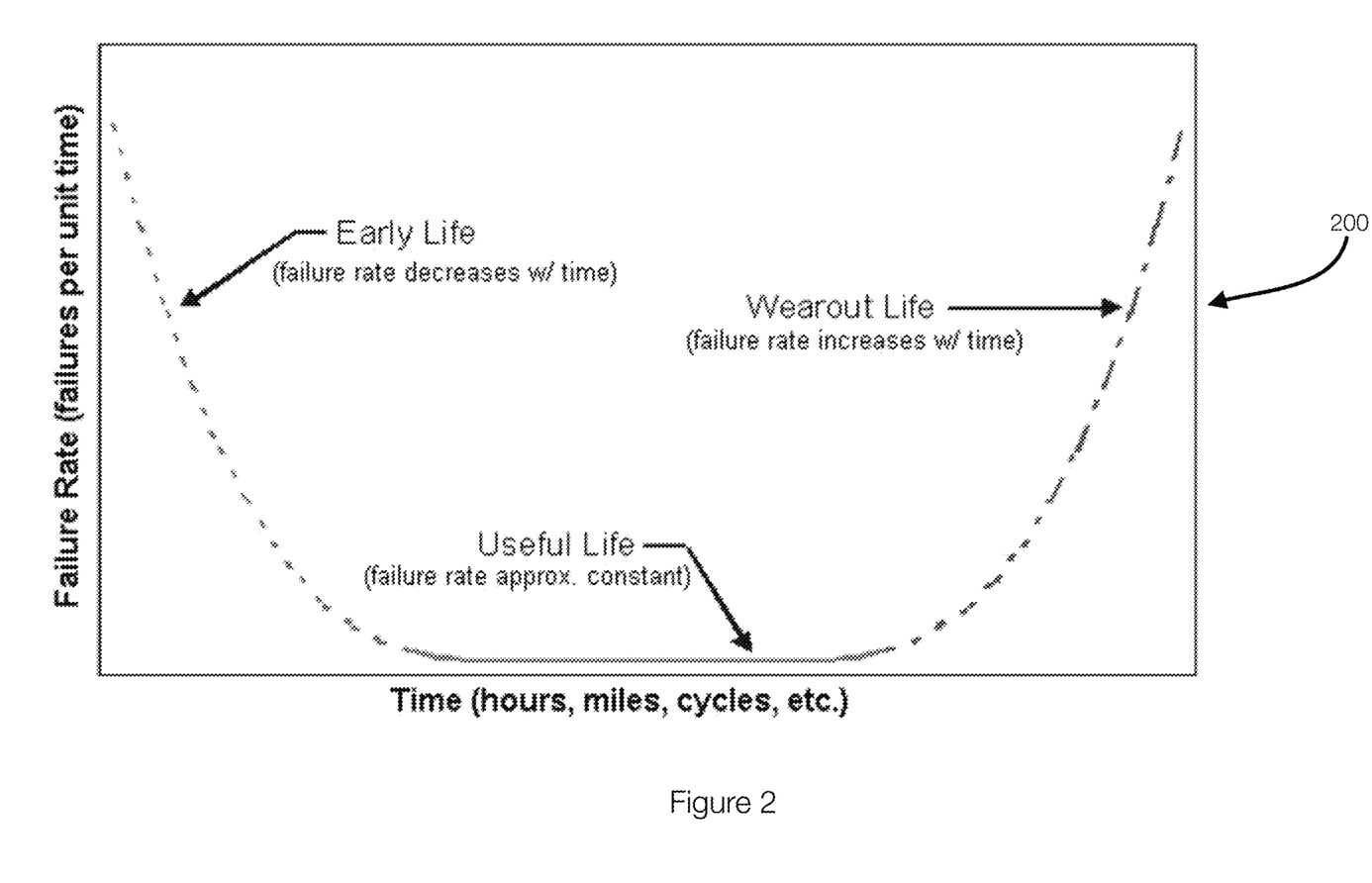
FIG. 2 discloses aspects of failures and the relationship of failures to the modulus.

Restore patterns, as previously stated, may change over time. FIG. 2 illustrates an example of a bathtub curve. The curve 200 illustrates the relationship between the Weibull modulus $\beta$ and a failure rate or, in this example, non-sequential read access patterns.

In the context of a restore operation, the Weibull modulus can be adapted to failures occurring the data access pattern. In the beginning of the restore operation, the modulus may be less than 1 and indicate a non-sequential pattern. As the modulus approaches 1, the read ahead cache would be enabled gradually. When the modulus departs from 1, the read ahead cache can be gradually enabled. In addition, the point at which the read ahead cache is enabled/disabled can be adjusted dynamically and the enablement/disablement of the read ahead cache can also be performed dynamically.

Embodiments of the invention model restore access patterns and embodiments of the invention determine a Weibull modulus from restore access patterns. This helps identify sub-populations for which a read ahead cache may be enabled or for which the read ahead cache is disabled.

A cumulative distribution function (CDF) refers to the probability that a non-sequential variable falls within a specified range (e.g., is greater than or equal to a stated lower limit and less than or equal to a stated upper limit).

In the case of the 2 parameter Weibull distribution, for a non-sequential variable t, the CDF(Q(t)) is given by:

$$F(t) = Q(t) = 1 - e^{-\left(\frac{t}{\eta}\right)^\beta} \quad \text{equation (1)}$$

This function (1) can be linearized and put in a common form:

$$y = mx + b$$

For example:

$$Q(t) = 1 - e^{-\left(\frac{t}{\eta}\right)^\beta}$$

$$\ln(1 - Q(t)) = \ln\left(e^{-\left(\frac{t}{\eta}\right)^\beta}\right)$$

$$\ln(1 - Q(t)) = -\left(\frac{t}{\eta}\right)^\beta$$

$$\ln(-\ln(1 - Q(t))) = \beta\left(\ln\left(\frac{t}{\eta}\right)\right)$$

$$\ln\left(\ln\left(\frac{1}{1 - Q(t)}\right)\right) = \beta\ln(t) - \beta\ln(\eta)$$

Next, by setting $$y = \ln\left(\ln\left(\frac{1}{1 - Q(t)}\right)\right)$$

and $$x = \ln(t) \quad \text{equation (2)}$$

the equation can be rewritten as $$y = \beta x - \beta\ln(\beta) \quad \text{equation (3)}$$

with an intercept of $$b = -\beta\ln(\eta) \quad \text{equation (4)}$$

With a population of data access patterns, a Weibull plot may be drawn using equations (2) and (3) above. A regression or fit analysis can be performed to linearize the plot. The slope of the resulting line m=β is the Weibull modulus for the population of access data patterns.

Figure 3:
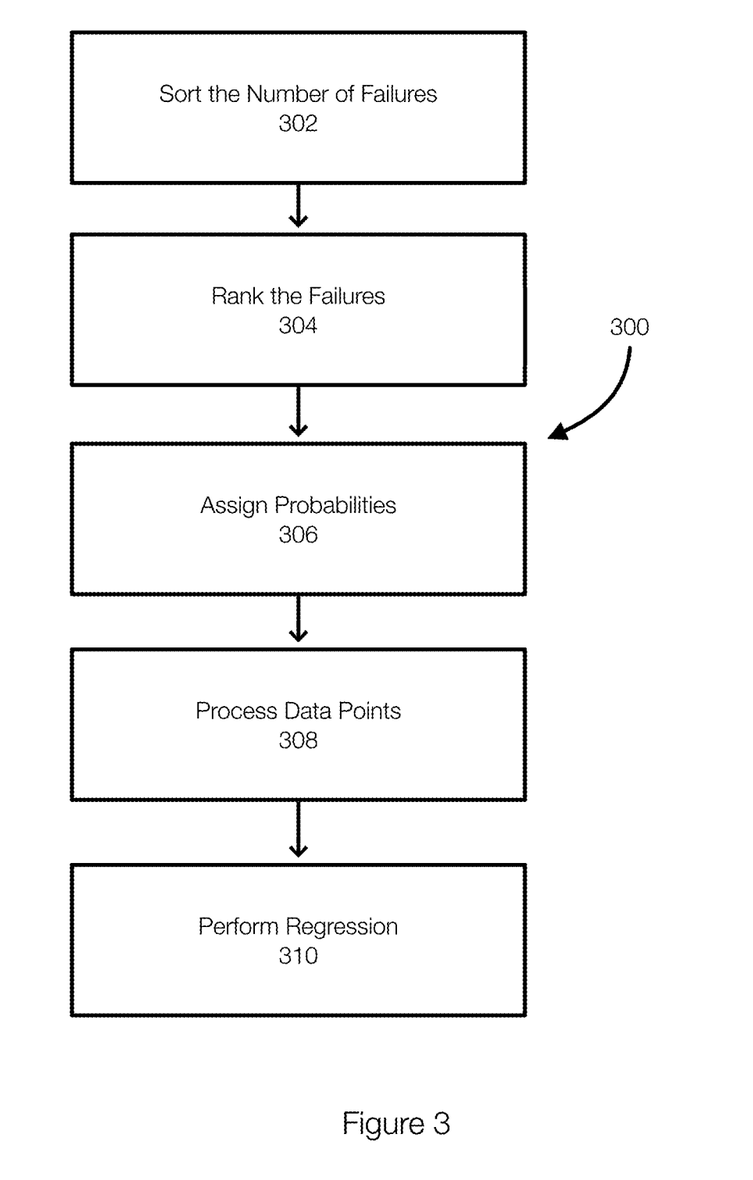
FIG. 3 discloses aspects of a method for determining a modulus such as a Weibull modulus.

FIG. 3 illustrates an example of a method for determining a modulus, such as a Weibull modulus. The modulus generated by the method 300 may govern or determine whether a read ahead cache is enabled/disabled during a restore operation. FIG. 3 is discussed with reference to FIGS. 4-8, which illustrates aspects of determining a modulus.

Figure 4:
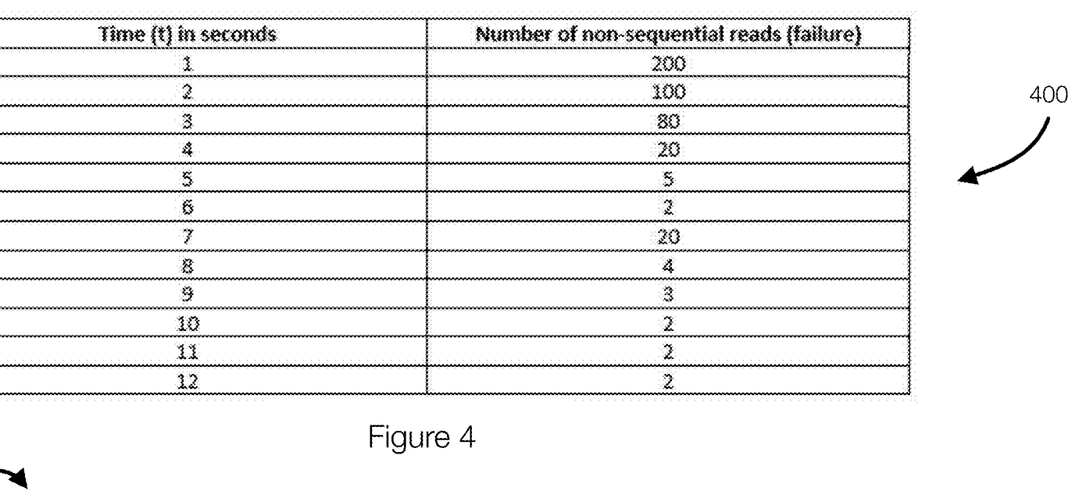
FIG. 4 discloses aspects of a population of data points from which a modulus is determined.

FIG. 4 illustrates a data set or population of data access patterns. In particular, FIG. 4 illustrates, for a 12 second period, the number of non-sequential reads or failures that occurred for each second. The modulus determined for this population can be used to determine whether read ahead caching is enabled or disabled. The table 400 may have been generated from a restore operation, for example.

By way of example only, the data set shown in the table 400 may be divided into two sub-populations. The first sub-population is from 1 to 6 seconds and the second subpopulation is from 7 to 12 seconds. Calculating or determining a modulus for the entire population or for sub-populations allows the modulus to be used for enabling/disabling read ahead caching.

Figure 5:
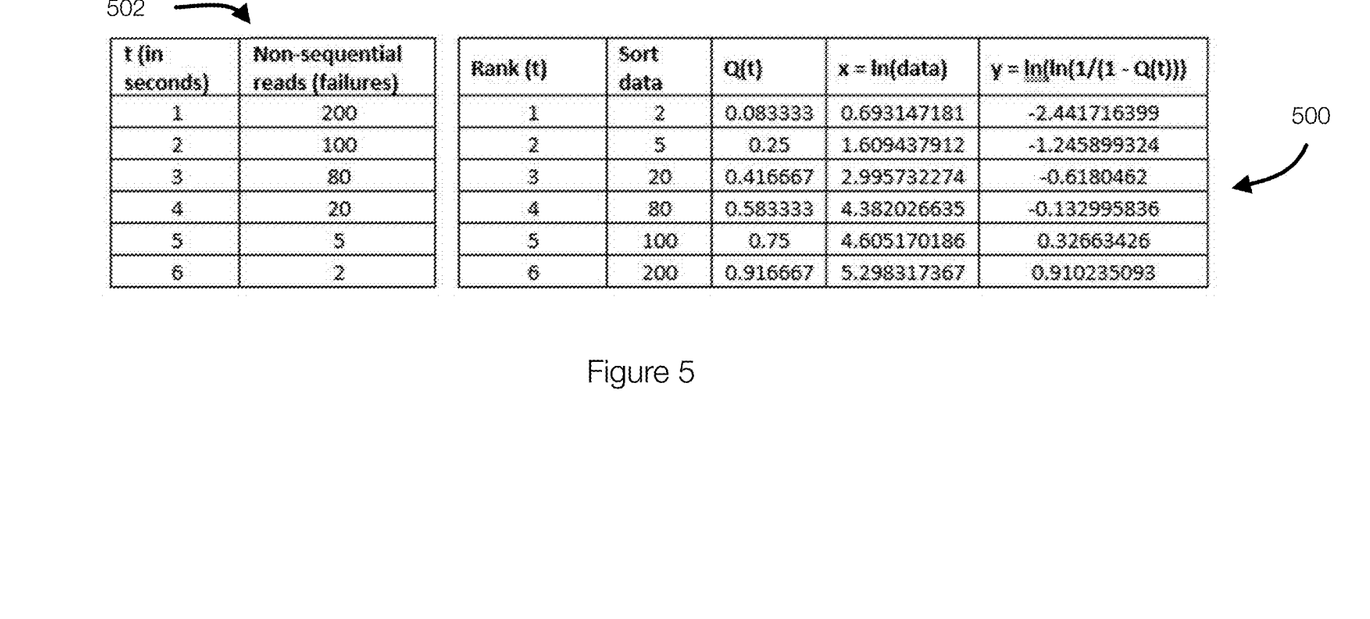
FIG. 5 discloses aspects of a sub-population of data that has been processed or analyzed while determining the modulus.
Figure 6:
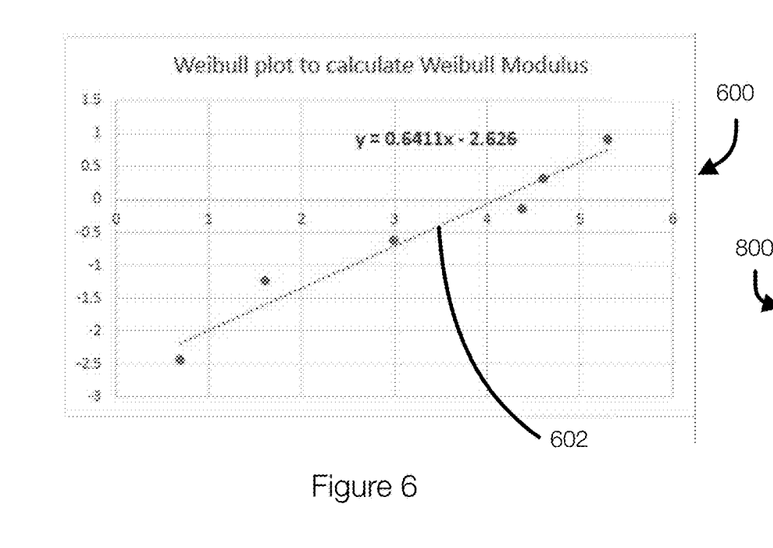
FIG. 6 discloses aspects of a regression to determine a linearization of a cumulative distribution function that includes the modulus.
Figure 7:
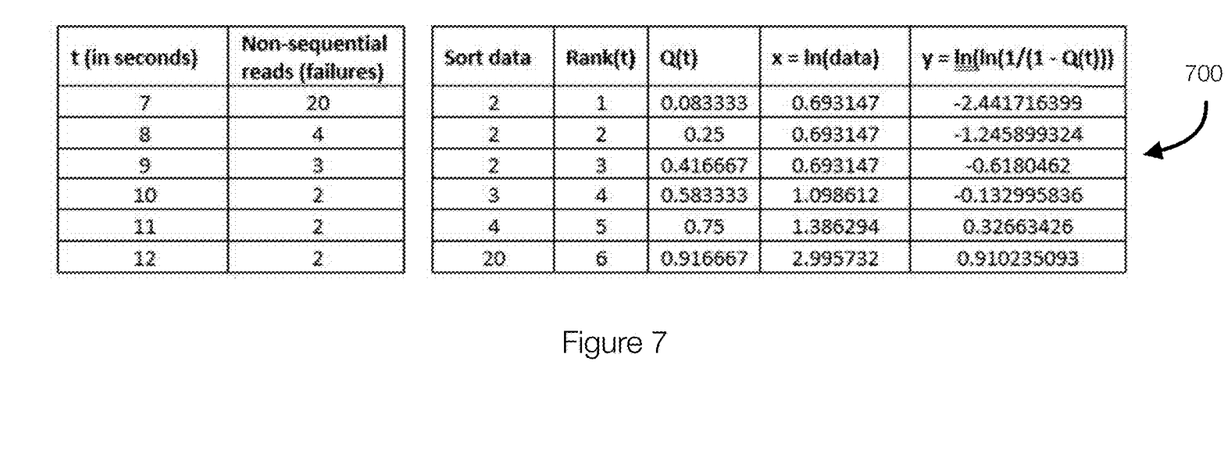
FIG. 7 discloses aspects of a sub-population of data that has been processed or analyzed while determining the modulus.
Figure 8:
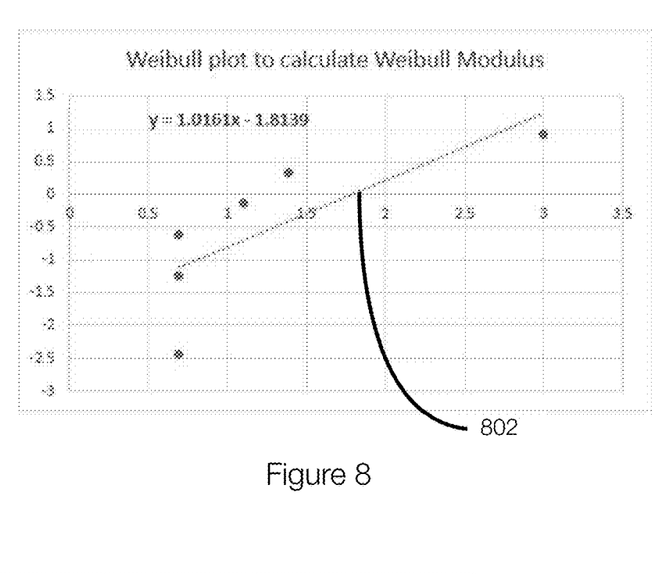
FIG. 8 discloses aspects of a regression to determine a linearization of a cumulative distribution function that includes the modulus.

FIG. 5 illustrates an example of a table 500 that is specific to the first sub-population. FIG. 6 illustrates a graph 600 that includes a plot to calculate or determine a modulus for the first sub-population. FIG. 7 illustrates an example of a table 700 that is specific to the second sub-population. FIG. 8 illustrates a graph 800 that includes a plot to determine a modulus for the second sub-population.

Returning to FIG. 3, the method 300 may include some preliminary steps such as acquiring the data set. The population or data sets may be from a present restore operation. In this case, the restore operation may track a history of accesses such that, at times, a population of data accesses can be analyzed. Alternatively, the data sets may be from previous restore operations. In other words, the access pattern of a previous restore operation may be used to perform a current restore operation. In addition, data access patterns from previous restore operations can be used in machine learning to augment and optimize the modulus determination process and/or the process by which the read ahead cache is enabled/disabled. A model or neural network can be trained using historical data sets and then the neural network can be used during a restore operation.

More specifically, by performing machine learning with data sets from previous restore operations, the modulus for subsequent restore operations can be determined using the trained model. The input used to train and or use the model may not be limited to data sets such as restore access patterns but may also include other data such as machine configuration, restore data size, or the like. Further, the modulus for a restore operation can be determined on-the-fly such that the read ahead cache can be enabled/disabled based on the modulus during the restore operation. In this example, the most recent data access patterns can be evaluated to determine a dynamic modulus that changes during the restore operation.

Once a data set is acquired, the data set may be sorted 302. More specifically, the number of non-sequential reads or failures in the data may be sorted. The table 502 illustrates the first-sub population and the table 500 illustrates that the data set for the first sub-population is sorted 302 (e.g., on a time basis or by unit time). The data is sorted in ascending order in this example. After sorting 302, the rank is assigned 304 (per unit time in this example) such that the lowest number of non-sequential reads is assigned a rank of 1, as illustrated in the table 500.

Next, each data point is assigned 306 a probability: Q(t)=P. For the restore access failure points, the samples in the population are ranked from the least number of failures to the most number of failures as illustrated in the table 500 the probability of restore access data failure is estimated as $Q(t) = P_i = (i - 0.5)/n$, where Pi is the rank of the $i^{th}$ specimen and n is the sample size (6 for this sub-population. For example, $P_3 = (3 - 0.5)/6 = 0.416667$.

As illustrated in the table 500, each data point at the same rank has the same probability Q(t). Thus, the data points can be viewed in the context of the rank in one embodiments.

Once the probabilities have been determined, the data points (or ranks) are processed 308. In this example, because the modulus is being linearized, the x and y values are determined (equations 2 and 3 above). These values (x and y) may be determined for each rank. The result is illustrated in the table 500. The table 500 illustrates x values for the data points at each rank and corresponding y values for the data points at each rank.

Processing 308 the data points or the ranks further includes plotting the x and y values determined for the ranks of the sub-population, as illustrated in the graph 600 shown in FIG. 6. The points are plotted and a regression 310 is performed to obtain, in this example, the line 602, which is a linearization of the CDF and is defined in this example as y=0.6411x−2.626. The slope of the line 602 is 0.6411 and is the modulus or the Weibull modulus β for the first sub-population.

In this example, y=mx+b is a linearized form of the Weibull CDF, where m=β. In this example and for the first sub-population, the modulus is less than 1 or, 0<β<1. As a result, the read ahead cache should be disabled for the first subpopulation due to the associated failure rate or due, more specifically, to the non-sequential access pattern indicated by the Weibull modulus.

FIG. 7 illustrates information for the second sub-population from seconds 7-12 that is similar to the information for the first sub-population shown in FIG. 5. The data points of the restore access pattern are sorted and ranked. The probability at each rank is then determined. Next, the x and y values for each data point or for each rank are determined as illustrated in the table 700.

FIG. 8 illustrates a plot of the x and y values of the ranks for the second sub-population. The regression results in a line 802 that has an equation of y=1.0161x−1.81139. The slope of the line 802, which is the Weibull modulus β, is greater than 1 and is close to 1. As a result, the read ahead cache may remain enabled for the second sub-population of data points.

When the first and second sub-populations shown in FIGS. 4-8 are considered together, the modulus allows the state of the read ahead cache to be changed over time. In this example, the read ahead cache should be initially disabled (e.g., for the first 5 seconds). As the modulus approaches 1, the read ahead cache can be enabled or gradually enabled. The modulus can be monitored and the state of the read ahead cache can be changed based on the determined modulus or in accordance with changes in the value of the modulus.

Figure 9:
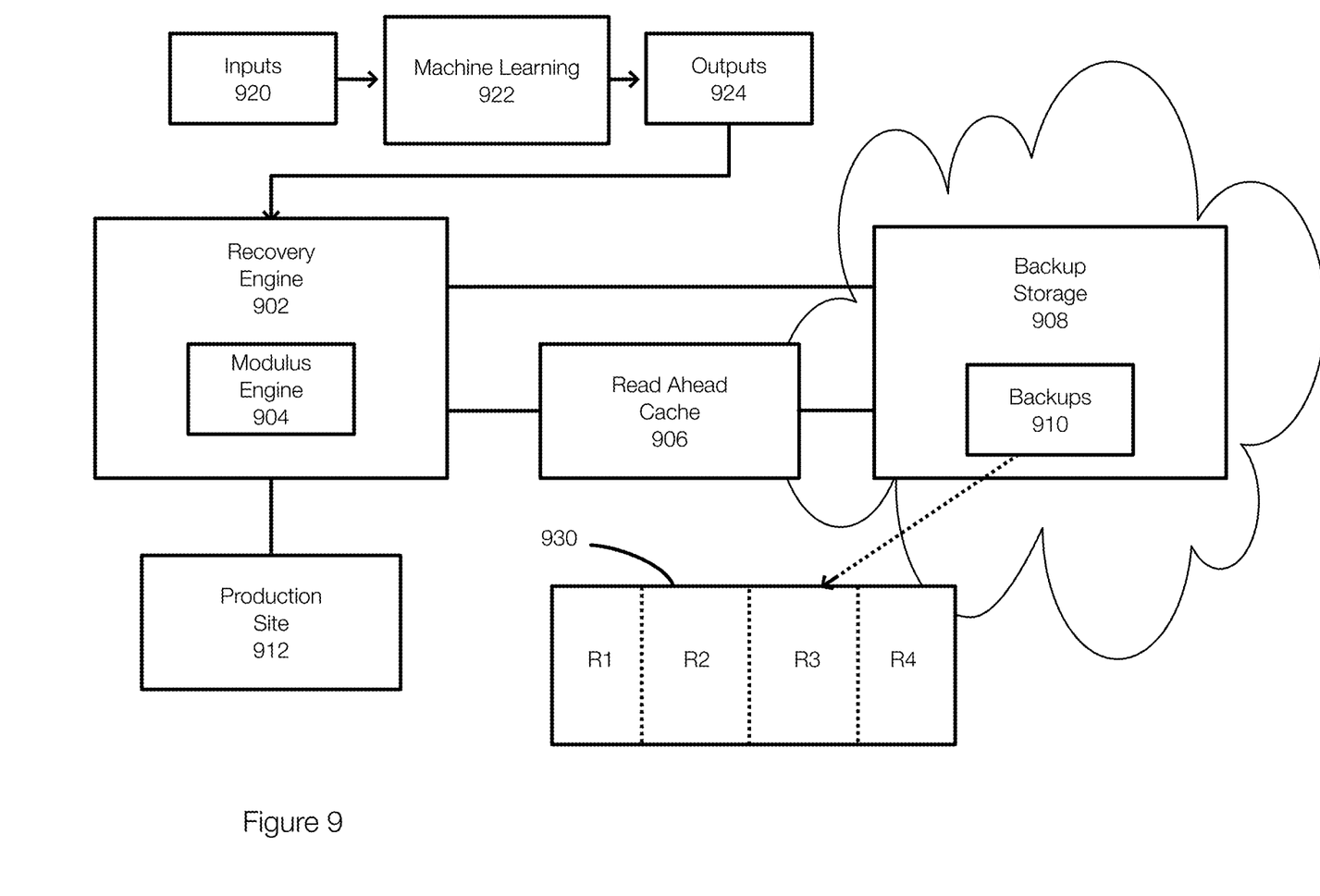
FIG. 9 discloses aspects of a data protection system that includes a modulus engine to determine a modulus and/or perform data protection operations based on the modulus.

FIG. 9 illustrates a computing environment in which a data protection operation may be performed, which may include determining a modulus for a restore operation that is used to control a state of a read ahead cache. FIG. 9 illustrates a recovery engine 902 (an example of a data protection system or portion thereof) that includes or is associated with a modulus engine 904. The recovery engine 902 may perform a data protection operation such as a recovery operation. The recovery operation may recover a backup from backups stored in backup storage 908 (e.g., the cloud or a datacenter). The recovery engine may recover the backup to a production site 912.

The organization and relationships of the recovery engine 902, the backup storage, and the production site may vary. For example, the recovery engine may be a physical or virtual server or appliance, located on site, in the cloud, or the like, or combination thereof. The production site may be an on-premise site, a cloud based site, or the like. The backup storage is typically cloud based storage and may be associated with a client or other server that is configured to cooperate with the recovery engine to perform data protection operations such as a recovery operation. For example, both the production site and the backup storage may be associated with a recovery engine.

Thus, the data protection operation may be cloud to cloud, intra-cloud, cloud to on-premise, or the like.

In this example, the modulus engine is configured to determine and/or monitor a modulus for the recovery operation and enable or disable the read ahead cache 906 accordingly. The modulus engine may perform this operation based on an analysis of historical restore access patterns for the present recovery operation and/or previously performed recovery operations.

More specifically, the recovery engine may be recovering the backup 930, which may be one of the backups and may correspond to a selected point in time. The backup, which corresponds to or is stored on a memory that is accessed by the recovery engine 902, may be divided into regions (R1, R2, R3, and R4). Access patterns, or a modulus, may be determined with respect to the regions individually and/or collectively. The access patterns are determined to be sequential or non-sequential. The sizes of the regions may be fixed or dynamically set based on offsets.

When determining the access pattern, a history of IOs (input/outputs or reads in the context of a restore operation) may be maintained for the backup 930 as a whole and/or for each region. The history of IOs allows the various access patterns to be determined as sequential or non-sequential. Whether an access is sequential with respect to a previous access may be determined according to offset. For example, an access may still be sequential if within a threshold distance (e.g., in terms of offset) from a previous access. The history of IOs may be used to generate a data set, such as illustrated in FIG. 4. Thus, the access pattern can be based on the number of successes (sequential data accesses) and failures (non-sequential data accesses) within a history of data accesses.

More generally, the data access pattern is determined based on a larger history of IOs. In one example, the number of failures (non-sequential accesses) may be determined per unit time. These failures can be processed as previously described to determine a modulus and the read ahead cache is enabled/disabled accordingly. The modulus may be updated over time or as new access pattern data is generated during the recovery operation.

As discussed herein, whether or not a specific access is sequential or non-sequential is distinct from the overall access pattern. Conventionally, the history of accesses can be used to determine an access pattern. If a percentage of sequential accesses during the most recent n IOs is above a threshold, the data access pattern may be sequential. Otherwise, the data access pattern is non-sequential. The modulus improves this situation and allows the thresholds to be dynamically adapted and thus improves the efficiency of the restore operation.

More specifically, when determining the access pattern, embodiments of the invention allow the determination to be dynamic and does not rely on a predetermined threshold. Thus, the threshold can be dynamic. In other words, rather that assuming that, if a certain percentage of the last n IOs are sequential, the access pattern is sequential and the next access is likely to be sequential, embodiments of the invention can calculate the probability of the next reads or accesses being sequential or non-sequential based on the modulus. This also allows the threshold values to be dynamically adjusted based on the modulus for a sub-population of data.

As the recovery engine 902 performs a recovery operation, the modulus engine 904 may store a history of IOs and determine a modulus for a recent sub-population of that history. As new history is generated, the modulus can be redetermined from the most recent sub-population. By dynamically generating the modulus with recent data, the modulus engine 904 can determine whether the current restore access pattern is likely to be sequential or non-sequential. This permits the dynamic adjustment of thresholds. For example, the threshold may be lowered when the modulus indicates that the access pattern is trending toward sequential. More specifically, as the modulus approaches 1, this may allow the read cache to be enabled sooner that if simply waiting for a hard threshold to be satisfied.

In addition, machine learning 922 may be employed. Inputs 920 to the machine learning 922 may include historical populations of access patterns. The historical data may thus be used to train the machine learning 922 and the trained model can be used based on current data. The outputs 924 thus predict access patterns. This may be combined with the determination of the modulus. For example, the outputs 924 can be used in conjunction with the modulus to make a decision regarding whether to enable/disable the read ahead cache. This may allow, for example, the read ahead cache to be enabled earlier or later than the modulus alone or the outputs 924 alone may suggest and further optimize the restore operation.

Figure 10:
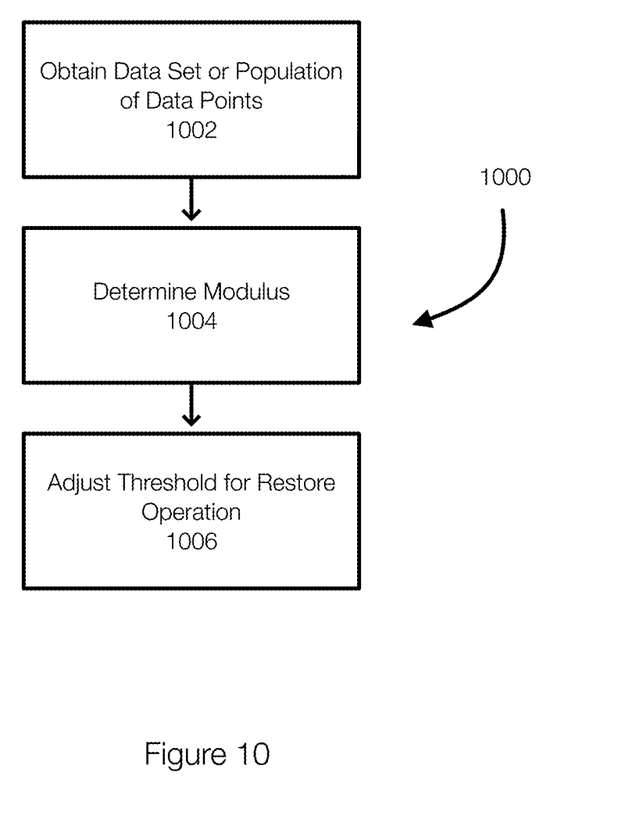
FIG. 10 discloses aspects of a method for enabling/disabling a read ahead cache used in performing a data protection operation.

FIG. 10 discloses aspects of determining a modulus for a recovery operation and/or adjusting thresholds based on the modulus. In the method 1000, a data set or population of data points is obtained 1002. The recovery engine typically tracks accesses and tracks whether an access is a success (sequential) or a failure (non-sequential). As a result, a population of failures per unit time is available.

Next, the modulus is determined 1004 from the sub-population. The value of the modulus is an indication as to the access pattern. Based on the modulus, the read ahead cache is either enabled or disabled.

In addition, thresholds for the restore operation may be adjusted 1006. The adjustment can be based on the probability that the next access pattern or the next reads are sequential.

The machine learning, which is based on historical access patterns, may be able to predict the probability of getting x number of sequential/non-sequential reads in a restore pattern. This type of information alone and/or combined with the modulus, allow thresholds to be dynamically adapted and self-adjusting.

Embodiments of the invention can determine a modulus that is used to enable/disable a read ahead cache. The modulus may be based on a historical restore access patterns and/or based on recent sub-populations of a current access pattern. Further, the modulus can be updated as the restore operation is performed. The modulus can be determined from a failure rate, the frequency of non-sequential accesses. Further, the thresholds associated with sequential and non-sequential access patterns can be dynamically adjusted. Machine learning or predictive analysis is also enabled to perform the adjustment of thresholds during a restore operation to improve performance.

In effect, restore patterns can be modeled by calculating a modulus on a sub-population of data. Performance can be improved, in terms of at least time and cost, using the Weibull modulus and the predictive analysis. By predicting the number of sequential reads or non-sequential reads and based on the modulus, the read ahead cache can be selectively enabled/disabled to improve the performance.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations. Such operations may include, but are not limited to, restore operations, sequential/non-sequential determination operations, modulus operations, cache enabling/disabling operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any of the disclosed processes, operations, methods, and/or any portion of any of these, may be performed in response to, as a result of, and/or based upon, the performance of any preceding process(es), methods, and/or operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1

A method, comprising: obtaining a data set that associates a number of failures with a time period for a recovery operation, sorting the data set, ranking the data set into ranks, wherein each rank corresponds to a unit of time, determining a probability for each data point in the data set, wherein data points in the same rank have the same probability, linearizing the determined probabilities by determining, for each rank, a plottable value, performing a regression on the plottable values to generate a line, and determining a modulus for the recovery operation from the regression line, and enabling or disabling a read ahead cache based on a value of the modulus.

Embodiment 2

The method of embodiment 1, further comprising sorting the data in ascending order.

Embodiment 3

The method of embodiment 1 and/or 2, wherein the plottable value include an x value and a y value.

Embodiment 4

The method of embodiment 1, 2, and/or 3, wherein the modulus is a Weibull modulus and is equal to a slope of the line.

Embodiment 5

The method of embodiment 1, 2, 3, and/or 4, further comprising determining that an access pattern is sequential and enabling the read ahead cache.

Embodiment 6

The method of embodiment 1, 2, 3, 4, and/or 5, further comprising determining that the access pattern is non-sequential and disabling the read ahead cache.

Embodiment 7

The method of embodiment 1, 2, 3, 4, 5, and/or 6, further comprising redetermining the modulus based on new data points.

Embodiment 8

The method of embodiment 1, 2, 3, 4, 5, 6, and/or 7, wherein a failure is a non-sequential access and a success is a sequential access.

Embodiment 9

The method of embodiment 1, 2, 3, 4, 5, 6, 7, and/or 8, further comprising determining an access pattern based on a threshold of sequential accesses and dynamically adapting the threshold based on the modulus.

Embodiment 10

The method of embodiment 1, 2, 3, 4, 5, 6, 7, 8, and/or 9, further comprising performing machine learning based on previous data sets and adapting the threshold based on an output of the machine learning and the modulus, wherein the output includes a probability of next reads being sequential or non-sequential.

Embodiment 11

A method for performing any of the operations, methods, or processes, or any portion of any of these or combination thereof disclosed herein.

Embodiment 12

A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device. As well, where any of the aforementioned elements comprise or consist of a virtual machine (VM), that VM may constitute a virtualization of any combination of the physical components disclosed herein.

In one example, the physical computing device may include a memory which may include one, some, or all, of random access memory (RAM), non-volatile memory (NVM) such as NVRAM for example, read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    obtaining a data set that associates a number of failures with a time period for a recovery operation;
    sorting the data set;
    ranking the data set into ranks, wherein each rank corresponds to a unit of time;
    determining a probability for each data point in the data set, wherein data points in the same rank have the same probability;
    linearizing the determined probabilities by determining, for each rank, a plottable value;
    performing a regression on the plottable values to generate a regression line;
    determining a modulus for the recovery operation from the regression line; and
    enabling or disabling a read ahead cache based on a value of the modulus.

2. The method of claim 1, further comprising sorting the data set in ascending order.

3. The method of claim 1, wherein the plottable value include an x value and a y value.

4. The method of claim 3, wherein the modulus is a Weibull modulus and is equal to a slope of the line.

5. The method of claim 1, further comprising determining that an access pattern is sequential and enabling the read ahead cache.

6. The method of claim 5, further comprising determining that the access pattern is non-sequential and disabling the read ahead cache.

7. The method of claim 1, further comprising redetermining the modulus based on new data points.

8. The method of claim 1, wherein a failure is a non-sequential access and a success is a sequential access.

9. The method of claim 1, further comprising determining an access pattern based on a threshold of sequential accesses and dynamically adapting the threshold based on the modulus.

10. The method of claim 9, further comprising performing machine learning based on previous data sets and adapting the threshold based on an output of the machine learning and the modulus, wherein the output includes a probability of next reads being sequential or non-sequential.

11. A non-transitory storage medium having stored therein instructions that are executable by one or more hardware processors to perform operations comprising:
    obtaining a data set that associates a number of failures with a time period for a recovery operation;
    sorting the data set;
    ranking the data set into ranks, wherein each rank corresponds to a unit of time;
    determining a probability for each data point in the data set, wherein data points in the same rank have the same probability;
    linearizing the determined probabilities by determining, for each rank, a plottable value;
    a performing a regression on the plottable values to generate a regression line; and
    determining a modulus for the recovery operation from the regression line;
    enabling or disabling a read ahead cache based on a value of the modulus.

12. The non-transitory storage medium of claim 11, further comprising sorting the data in ascending order.

13. The non-transitory storage medium of claim 11, wherein the plottable value include an x value and a y value.

14. The non-transitory storage medium of claim 13, wherein the modulus is a Weibull modulus and is equal to a slope of the line.

15. The non-transitory storage medium of claim 11, further comprising determining that an access pattern is sequential and enabling the read ahead cache.

16. The non-transitory storage medium of claim 15, further comprising determining that the access pattern is non-sequential and disabling the read ahead cache.

17. The non-transitory storage medium of claim 11, further comprising redetermining the modulus based on new data points.

18. The non-transitory storage medium of claim 11, wherein a failure is a non-sequential access and a success is a sequential access.

19. The non-transitory storage medium of claim 11, further comprising determining an access pattern based on a threshold of sequential accesses and dynamically adapting the threshold based on the modulus.

20. The non-transitory storage medium of claim 19, further comprising performing machine learning based on previous data sets and adapting the threshold based on an output of the machine learning and the modulus, wherein the output includes a probability of next reads being sequential or non-sequential.

* * * * *